United States Patent
Chen et al.

(10) Patent No.: US 10,514,935 B2
(45) Date of Patent: Dec. 24, 2019

(54) SYSTEM AND METHOD FOR THIRD PARTY APPLICATION ENABLEMENT

(71) Applicant: salesforce.com, inc., San Francisco, CA (US)

(72) Inventors: Peng-Wen Chen, Foster City, CA (US); Gautam Vasudev, San Francisco, CA (US); David Louvton, Berkeley, CA (US); Bibin Abraham, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/799,031

(22) Filed: Oct. 31, 2017

(65) Prior Publication Data

US 2019/0129730 A1 May 2, 2019

(51) Int. Cl.
*G06F 9/445* (2018.01)
*G06F 8/61* (2018.01)
*H04L 29/08* (2006.01)
*H04L 12/24* (2006.01)
*G06F 8/38* (2018.01)

(52) U.S. Cl.
CPC ............ *G06F 9/44505* (2013.01); *G06F 8/38* (2013.01); *G06F 8/61* (2013.01); *H04L 41/0806* (2013.01); *H04L 67/20* (2013.01); *H04L 67/34* (2013.01)

(58) Field of Classification Search
None
See application file for complete search history.

(56) References Cited

U.S. PATENT DOCUMENTS

| 8,261,295 B1* | 9/2012 | Risbood | G06F 9/44505 719/328 |
| 2009/0265707 A1* | 10/2009 | Goodman | G06F 9/5016 718/1 |
| 2012/0047239 A1* | 2/2012 | Donahue | G06F 9/5072 709/220 |

(Continued)

OTHER PUBLICATIONS

Zhang, "Securing Elastic Applications on Mobile Devices for Cloud Computing", 2009, ACM CCSW'09 (Year: 2009).*

*Primary Examiner* — Hossain M Morshed
(74) *Attorney, Agent, or Firm* — Sterne, Kessler, Goldstein & Fox, P.L.L.C.

(57) ABSTRACT

Disclosed herein are system, method, and computer program product embodiments for enabling and/or configuring cloud-based application. In an embodiment, a cloud system provides a cloud-based computing platform accessible by user input devices to perform cloud-based computing. The cloud system also includes an application exchange, allowing user input devices to select other cloud-based applications and/or software to enable and use with the cloud-based computing platform. The cloud-based application may be hosted by a third party cloud system that enables the functionality of the cloud-based application. When a user input device selects a cloud-based application to enable, cloud system generates an installation and configuration process to seamlessly install and configure the cloud-based application within the cloud-based computing platform. In this manner, the cloud system integrates the configuration process into the cloud-based computing platform.

20 Claims, 5 Drawing Sheets

(56) References Cited

U.S. PATENT DOCUMENTS

| | | | |
|---|---|---|---|
| 2012/0185874 A1* | 7/2012 | Cookson | G06F 9/4843 |
| | | | 719/313 |
| 2014/0040656 A1* | 2/2014 | Ho | G06F 9/5077 |
| | | | 714/3 |
| 2014/0136949 A1* | 5/2014 | Wang | H04M 1/2535 |
| | | | 715/234 |
| 2014/0196022 A1* | 7/2014 | Skutin | G06F 8/61 |
| | | | 717/176 |
| 2014/0282495 A1* | 9/2014 | Chico de Guzman Huerta | |
| | | | G06F 8/61 |
| | | | 717/177 |
| 2015/0187146 A1* | 7/2015 | Chen | G07C 5/008 |
| | | | 701/31.5 |
| 2017/0131987 A1* | 5/2017 | Chen | G06F 8/60 |
| 2017/0339221 A1* | 11/2017 | Wang | H04L 67/1014 |
| 2018/0006883 A1* | 1/2018 | Melliere | G06F 9/44505 |

\* cited by examiner

SYSTEM AND METHOD FOR THIRD PARTY APPLICATION ENABLEMENT

BACKGROUND

As computing evolves beyond native application usage to more cloud-based solutions, computing complexity grows as well. While operating systems conventionally installed and configured applications downloaded or stored locally, installing or configuring cloud-based applications has introduced new challenges. For example, some cloud-based applications execute on systems remote from the client computing devices accessing the applications. Enabling and configuring these applications has increased the complexity of set-up for user access.

Additionally, when accessing some applications, a user may be required to interact with a third party system that hosts the application. Enabling and configuring applications hosted by third party systems further introduces other communication complexities. At times, users may be required to access separate Internet web pages or send separate communications to the third party system to configure and access these applications. This process is inefficient and cumbersome for users.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for enabling and configuring cloud-based applications.

The systems and methods described herein operate to generate a seamless installation and configuration process for cloud-based applications. In an embodiment, when a user seeks to enable a cloud-based application, users will be able to enable, install, and configure the cloud-based application without needing to separately interact with the host of the application via a different configuration method. The user will be able to enable and configure the cloud-based application using the same medium that the user utilizes to interact with the cloud-based application.

For example, a user may be utilizing a first platform for computing. This first platform may be, for example, a remote desktop, a virtual desktop, a cloud-computing platform, an enterprise computing platform, a cloud-based software application, Infrastructure as a Service (IaaS) application, Platform as a Service (PaaS) application, or other types of cloud-based computing. In an embodiment, a user utilizes a user input device or a client device to access and interact with the first platform. This access may occur via an Internet browser and/or an application natively installed on the user input device.

While utilizing the first platform, the user may seek to enable a second platform for use with the first platform. The second platform, may be, for example, a cloud-based software application, a Software as a Service (SaaS) application, and/or other types of applications or software functionality. Using the systems and methods disclosed herein, users will be able to seamlessly configure and enable the second platform within the first platform. In this manner, users will also be able to avoid separately contacting the host of the second platform to perform configurations outside of the first platform medium.

These features will now be discussed with respect to the corresponding figures.

Figure 1:
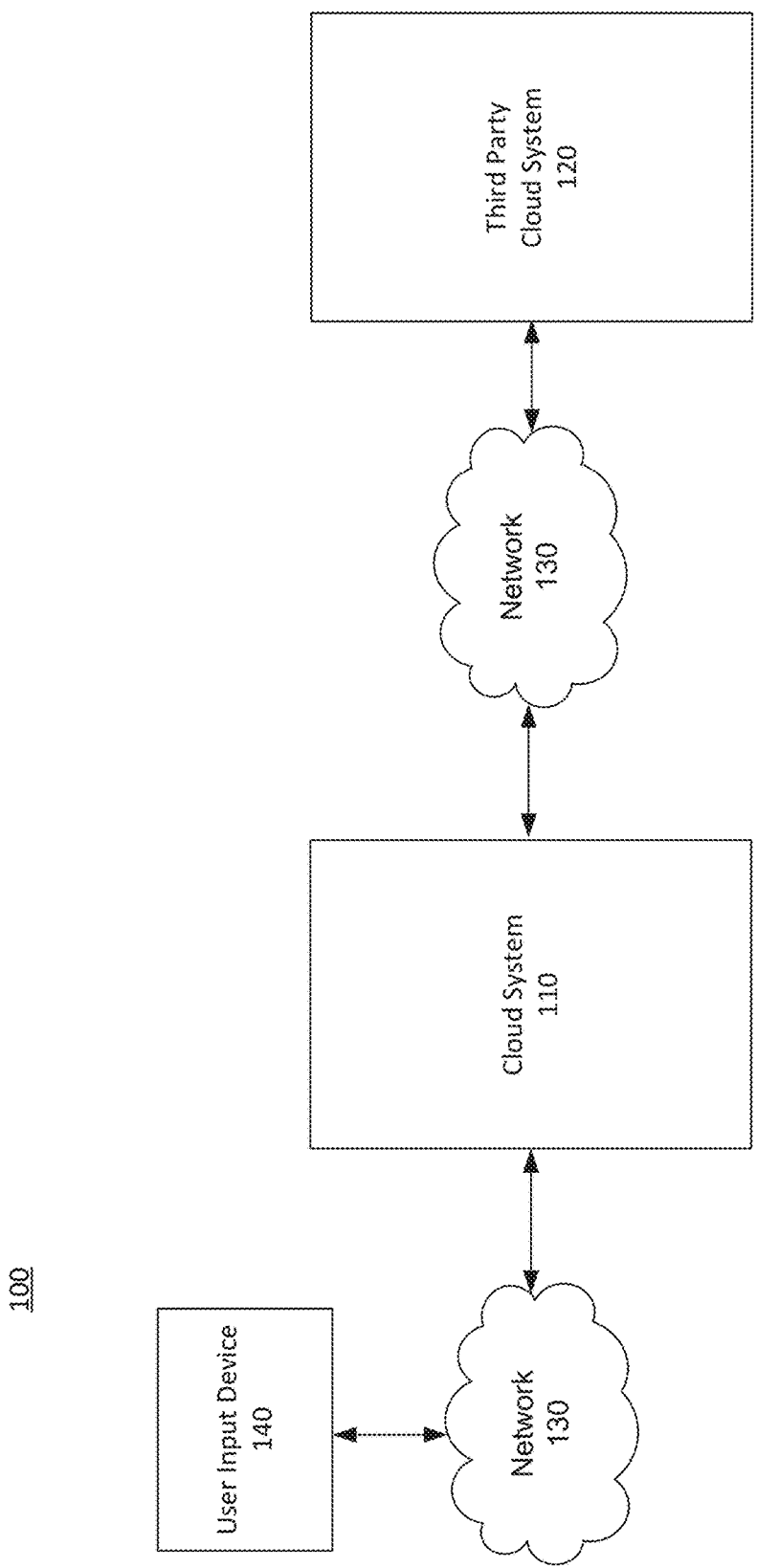
FIG. 1 illustrates a block diagram of an application enabling environment, according to some embodiments.

FIG. 1 is a block diagram of an application enabling environment 100, according to some embodiments. In an embodiment, application enabling environment 100 allows users to install, enable, configure, and/or access applications and application functionality to be utilized in cloud-based applications. Application enabling environment 100 includes cloud system 110, third party cloud system 120, network 130, and user input device 140.

In an embodiment, cloud system 110 includes one or more processors, memory, servers, routers, modems, and/or antennae configured to interface with third party cloud system 120, network 130, and/or user input device 140. Cloud system 110 executes and manages a cloud-based computing platform and/or user access to the cloud-based computing platform. The cloud-based computing platform may be, for example, a remote desktop, a virtual desktop or virtual computing, a cloud-computing platform, an enterprise computing platform, a cloud-based software application, an Infrastructure as a Service (IaaS) application, a Platform as a Service (PaaS) application, and/or or other types of cloud-based computing. In an embodiment, to enable the cloud-based computing functionality, cloud system 110 may utilize a centralized hardware architecture using, for example, a server and/or database configuration. In an embodiment, cloud system 110 may utilize a distributed hardware architecture, including distributed systems and/or subsystems. The distributed systems may include one or more servers and/or databases interfaced via network 130.

In an embodiment, cloud system 110 may execute an operating system allowing users to perform native computing functions in a virtual environment. For example, users may be able to store, manipulate, and/or manage data in the virtual environment. Data may be text, image, audio, video, and/or other data submitted by a user. In an embodiment, the virtual environment also allows a user to enable and utilize software in conjunction with the remote computing functionality. Users may select applicable applications, software, and/or functions of the virtual environment to enable based on the computing needs of the user. Users are able to customize the functionality via interactions with cloud system 110. An embodiment of application enablement is described with reference to application exchange 212.

In an embodiment, cloud system 110 allows user input device 140 to access the cloud-based computing platform executing on cloud system 110. Cloud system 110 communicates with user input device 140 and/or third party cloud system 120 via network 130 and/or a network protocol to send and receive data over network 130.

Network 130 is a network capable of transmitting information either in a wired or wireless manner and may be, for example, the Internet, a Local Area Network (LAN), or a Wide Area Network (WAN). The network protocol may be, for example, a hypertext transfer protocol (HTTP), a TCP/IP protocol, User Datagram Protocol (UDP), Ethernet, cellular, Bluetooth, or an asynchronous transfer mode, to name just a few examples, or any combination thereof.

In an embodiment, to access and/or utilize the cloud-based computing platform executing on cloud system 110, a user utilizes user input device 140 to generate communications and interact with cloud system 110. In an embodiment, user input device 140 interacts with cloud system 110 via network 130. User input device 140 may allow a user to access cloud system 110 using an Internet browser, internet protocols, and/or links such as Uniform Resource Locators (URLs). Interactions with the Internet browser will be transmitted from user input device 140 and received at cloud system 110. In an embodiment, user input device 140 may utilize a natively installed application configured to communicate with cloud system 110 over network 130. For example, user input device 140 may utilize a software application installed natively when user input device 140 communicates with cloud system 110 and network 130 utilizes LAN configuration.

In addition to interacting with user input device 140, cloud system 110 interacts with third party cloud system 120. Third party cloud system 120 may be a cloud computing system remote from cloud system 110 and/or user input device 140. For example, an administrator of cloud system 110 may not have permissions to configure and/or be an administrator of third party cloud system 120. Third party cloud system 140 may utilize different security protocols from cloud system 110 and/or belong to a different organization from the organization administrating cloud system 110. An administrator of cloud system 110 may have certain permissions that allow access to certain functions of third party could system 120.

Third party cloud system 120 may host a cloud-based software application, such as, for example, a Software as a Service (SaaS) application, and/or other types of applications or software functions. Cloud system 110 is able to communicate with third party cloud system 120 via network 130 to access the hosted software applications. Based on this access, cloud system 110 is able to provide this software functionality to user input device 140. User input device 140 is able to utilize cloud system 110 to enable the software functionality and/or utilize the software functionality while performing cloud-based computing hosted by cloud system 110. In an embodiment, user input device 140 selects one or more software applications hosted by third party cloud system 120 to be used in conjunction with other software functions hosted by cloud system 110.

In an embodiment, cloud system 110 hosts an application exchange that allows user input device 140 to browse software applications and to select software applications to enable. The application exchange may list applications hosted by cloud system 110 and/or third party cloud system 120. User input device 140 may view a list of the available applications using a graphical user interface generated by cloud system 110 and/or displayed on user input device 140.

In an embodiment, based on the user selection, cloud system 110 enables the selected application. If the application is locally hosted on cloud system 110, cloud system 110 grants access to the selected application. In an embodiment, if the user has an account or profile associated with cloud system 110, cloud system 110 also associates the selected application with the user's account or profile.

In an embodiment, if the selected application is hosted by third party cloud system 120, cloud system 110 may retrieve an installation package from third party cloud system 120. Cloud system 110 may utilize the installation package to enable software functions within the computing environment hosted by cloud system 110 for use by user input device 140. This process is described in greater detail with reference to FIG. 4. In an embodiment, cloud system 110 may have downloaded the installation package prior to the user selection and may enable the application in response to a selection by a user. In an embodiment, after a user has selected an application, cloud system 110 associates the application with the user account. In this manner, if the user utilizes multiple user input devices 140, the user will be able to utilize the applications tied to his or her respective user account. User input device 140 may be a computing device, such as, for example, a desktop computer, a laptop computer, a mobile phone, a tablet device, and/or other computing devices capable of enabling cloud-based computing.

Along with the installation process, cloud system 110 performs a configuration process to enable communications between user input device 140 and third party cloud system 120. This configuration process may include the transmission of personal user information and/or user settings from user input device 140 to third party cloud system 120. While a user utilizing user input device 140 may utilize the cloud-based computing functionality of cloud system 110, cloud system 110 is able to seamlessly communicate with third party cloud system 120 to allow the user to utilize the software functionality hosted by third party cloud system 120 within the computing platform provided by cloud system 110. In this manner, users will also be able to avoid separately contacting the host or administrator of third party cloud system 120 to perform configurations outside of cloud system 110. An embodiment of this configuration process is described with reference to FIG. 2.

While FIG. 1 depicts one user input device 140 and one third party cloud system 120, cloud system 110 is able to interface with multiple user input device 140 and multiple third party cloud system 120. Many users may utilize user input device 140 to access the cloud-based computing capabilities of cloud system 110. Cloud system 110 may also interface with many different third party cloud systems 120 to provide access to different software applications hosted by different third party cloud systems 120. In this manner, cloud system 110, manages multiple user accounts with associated enabled applications so that users may utilize different user input devices 140 to perform cloud-based computing. The users will also be able to utilize their enabled applications and interface with third party cloud system 120.

Figure 2:
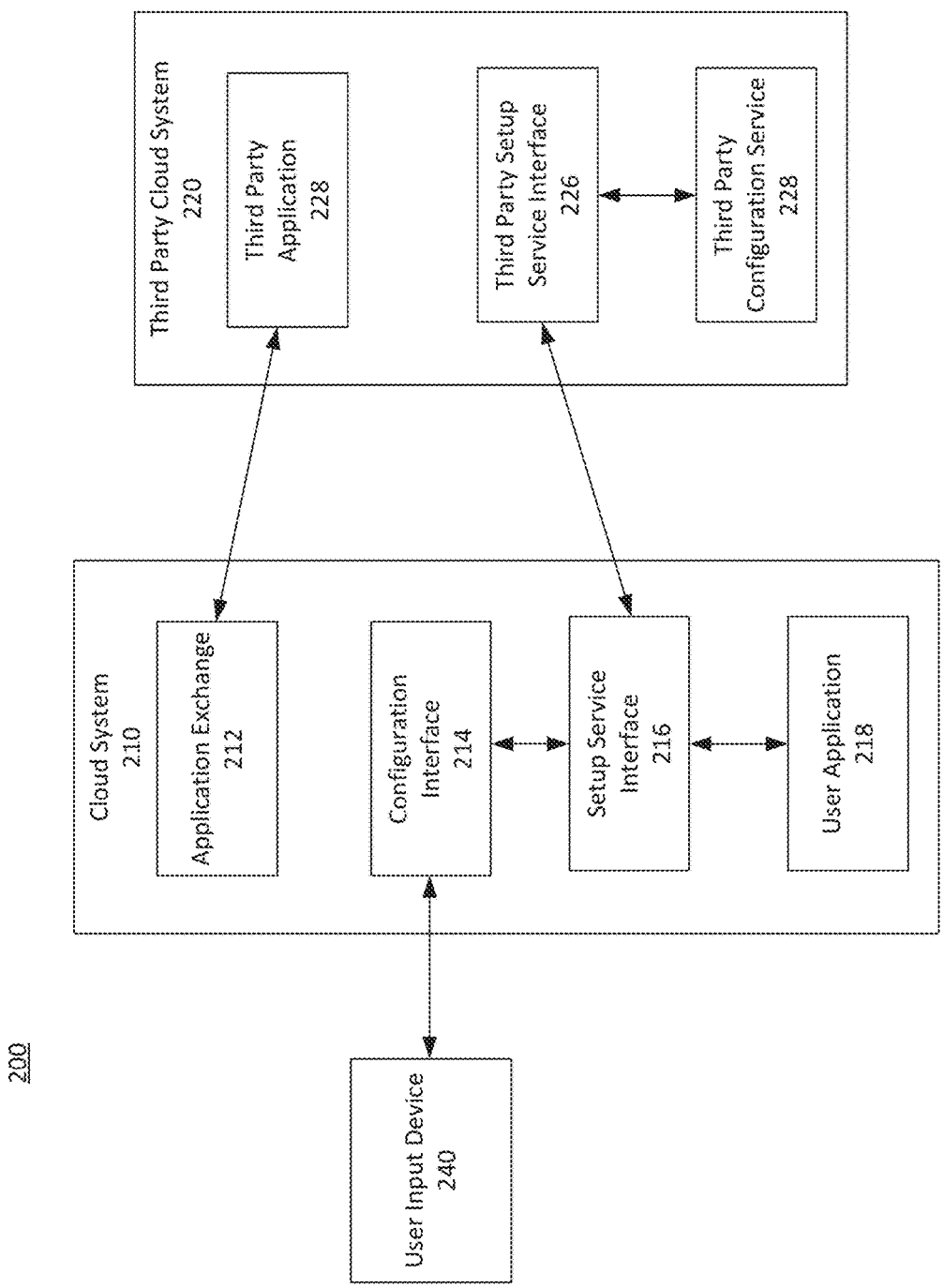
FIG. 2 illustrates a block diagram of an application enabling environment demonstrating component communication flow, according to some embodiments.

FIG. 2 illustrates a block diagram of an application enabling environment 200 demonstrating component communication flow, according to some embodiments. In an embodiment, application enabling environment 200 may include cloud system 210, third party cloud system 220, and user input device 240. Cloud system 210 may comprise components similar to and may operate in a manner similar to cloud system 110 described with reference to FIG. 1. Third party cloud system 220 may comprise components similar to and may operate in a manner similar to third party cloud system 120 described with reference to FIG. 1. User input device 240 may comprise components similar to and may operate in a manner similar to user input device 140 described with reference to FIG. 1. In an embodiment, cloud system 210, third party cloud system 220, and/or user input device 240 communicate using a network similar to network 130 described with reference to FIG. 1.

Cloud system 210 includes various components and subsystems configured to execute a software application configuration process. In an embodiment, cloud system 210 includes application exchange 212, configuration interface 214, setup service interface 216, and/or user application 218. In an embodiment, application exchange 212 is a distribution platform allowing users to select applications and/or software functions for use with the cloud-based computing platform provided by cloud system 210. Application exchange 212 may be an application installed on cloud system 210 and/or hosted on a system remote from cloud system 210. In an embodiment, application exchange 212 manages one or more lists of available applications and/or software functions that user input device 240 can select to enable and/or utilize. User input device 240 may browse and/or select software applications listed. In an embodiment, user input device 240 may navigate the one or more lists using a graphical user interface generated by cloud system 110 and/or displayed on user input device 240. In an embodiment, an application installed on user input device 240 may allow a user to communicate with cloud system 210 to interact with application exchange 212. In an embodiment, user input device 240 may utilize an Internet browser to access application exchange 212 and select applications from application exchange 212 for enablement and use with the cloud-based computing provided by cloud system 210.

In an embodiment, if a user input device 240 selects an application, cloud system 210 grants access to the selected application. In an embodiment, if the user is associated with an account or profile managed by cloud system 210, cloud system 210 also associates the selected application with the user's account or profile.

In addition to managing a list of available software applications, application exchange 212 also interfaces with third party cloud system 220. Third party cloud system 220 provides application information to application exchange 212 so that third party application 228 may be listed on application exchange 212. Third party application 228 may be, for example, a cloud-based software application, a Software as a Service (SaaS) application, an object, a dashboard, a tab listing functions provided by third party cloud system 220, and/or other tools or commands that may be used in conjunction with the cloud-based computing platform hosted by cloud system 210. Listing third party application 228 on application exchange 212 allows user input device 240 to view details related to third party application 228 and allows a user to determine whether to enable third party application 228 for use with the cloud-based computing provided by cloud system 210. In an embodiment, application exchange 212 interfaces with multiple third party cloud systems 220 to list multiple third party applications 228 available for selection by user input device 240. In an embodiment, application exchange 212 may expose the name of third party application 228, application commands provided by third party application 228, and/or user input device 240 specification requirements recommended for using third party application 228.

In an embodiment, while third party cloud system 220 exposes some information related to third party application 228 to be displayed on application exchange 212, third party cloud system 220 still hosts third party application 228. When user input device 240 enables third party application for use with the cloud-based computing provided by cloud system 210, user input device 240 may still utilize functions of third party application 228 provided by third party cloud system 220.

Figure 3:
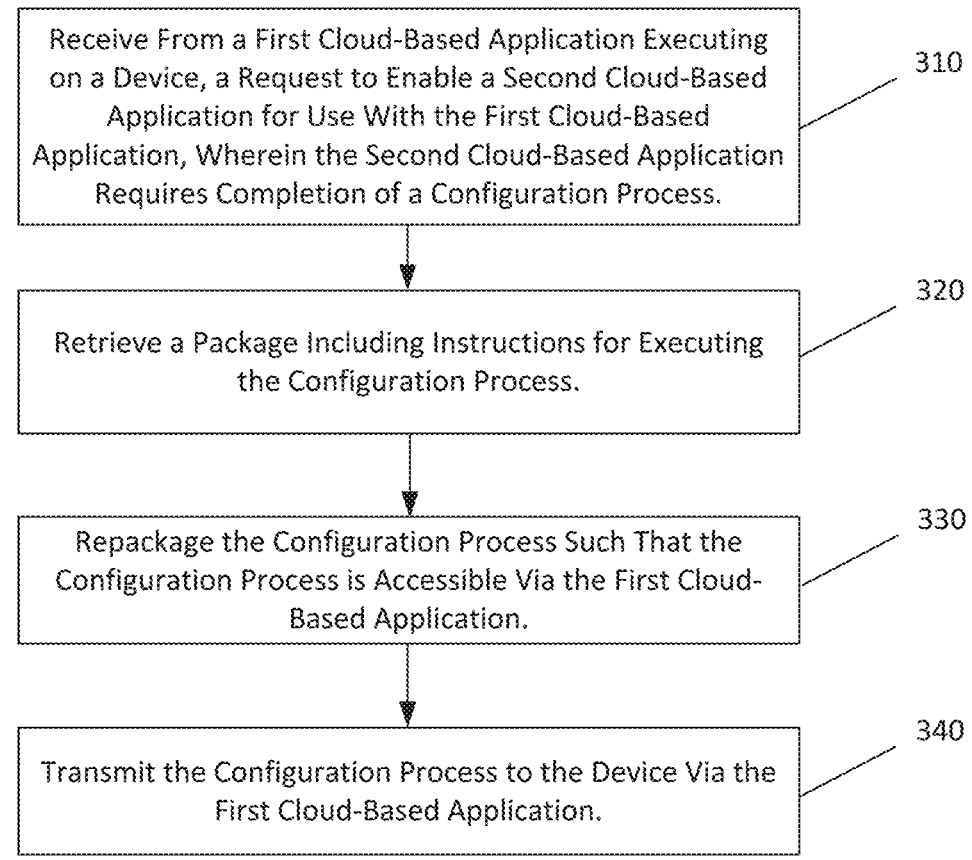
FIG. 3 illustrates a flowchart illustrating a method for enabling a configuration process, according to some embodiments.
Figure 4:
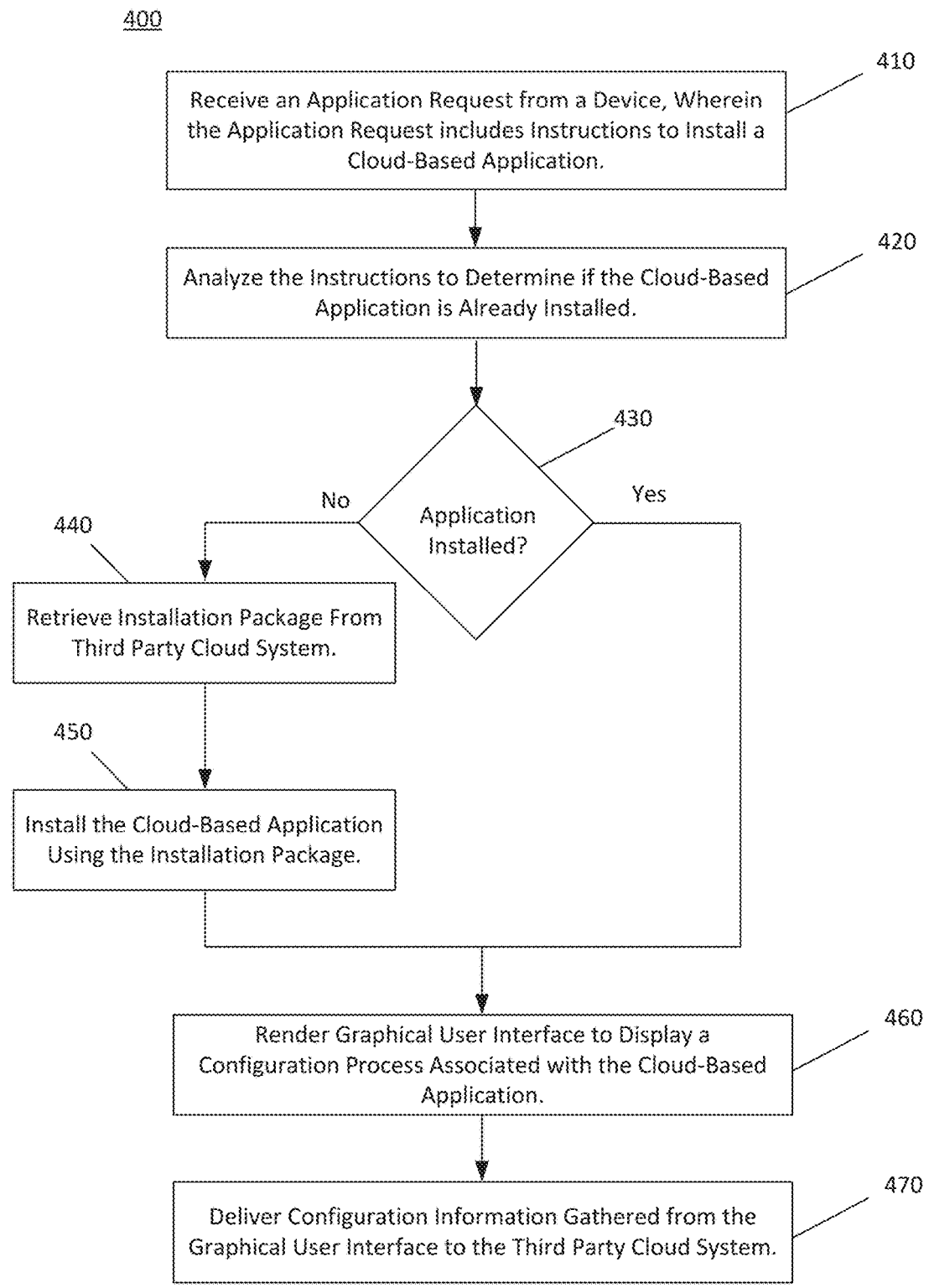
FIG. 4 illustrates a flowchart illustrating a method for executing an installation and configuration process, according to some embodiments.

In an embodiment, user input device 240 may navigate application exchange 212 and select third party application 228 to be enabled for use in the cloud-based computing environment provided by cloud system 210. Based on this selection cloud system 210 begins an installation process and/or a configuration process so that user input device 240 is able to utilize third party application 228. FIG. 3 and FIG. 4 illustrate embodiments of processes for installing and/or configuring third party application 228 for use by user input device 240 and the corresponding cloud-based computing platform hosted by cloud system 210.

In an embodiment, when user input device 240 selections third party application 228 from application exchange 212, cloud system 210 checks to determine whether cloud system 210 has previously enabled third party application 228 via the installation of user application 218. To perform this check, cloud system 210 may check an internal registry of installed applications. In an embodiment, cloud system 210 checks the internal registry for the presence of user application 218. User application 218 may be a mirror of third party application 228 and may represent an installed version of third party application 228. In an embodiment, user application 218 also retains user parameters, configurations, and/or settings that customize third party application 228 for individual user profiles and/or user input devices 240. User application 218 stores an instance of third party application 228 and/or acts as a medium for communication with third party application 228. In an embodiment, user application 218 stores certain files and/or programs for execution and use in conjunction with third party cloud system 220 to allow user input device 240 to enable and/or utilize the functions of third party application 228.

In an embodiment, enabling third party application 228 includes installing, generating, and/or creating an instance of user application 218. Enabling third party application 228 may include retrieving and/or downloading an application package from third party cloud system 220. In an embodiment, cloud system 210 retrieves the application package via an application programming interface (API) provided by third party cloud system 220. Cloud system 210 installs files contained in the application package locally, including, for example, graphical user interface generation objects and/or software code to be executed by cloud system 210 based on commands received from user input device 240. Via the installation of user application 218, cloud system 210 is able to execute the functions of third party application 228 locally on cloud system 210 and/or establish communications with third party cloud system 220 to perform the functions of third party application 228 together.

In an embodiment, in addition to possibly installing third party application 228 as user application 218, cloud system 210 may also configure user application 218. Configuration of user application 218 includes (1) configuring user application 218 to store user settings and/or preferences related to the services and functionality provided by third party application 228 and/or (2) providing information to third party cloud system 220 to enable user input device 240 to interact with third party cloud system 220 and/or access the services provided by third party application 228. Providing information to third party cloud system 220 may include providing preferences, settings, log-in credentials, security information, and/or other user information that allows cloud system 210 to provide access to third party application 228 to user input device 240. In an embodiment, cloud system 210 generates a graphical user interface to display this configuration process to user input device 240 so that user input device 240 may supply the configuration information.

Based on the selection of third party application 228 by user input device 240, cloud system 210 checks to determine if the third party application 228 is already enabled based on an installation of user application 218. If user application 218 is not installed, cloud system 210 performs the installation process and the configuration process. If user application 218 is already installed based on a checking of the registry, cloud system 210 performs the configuration process.

As detailed above, the installation process may include a retrieval of an installation package from third party cloud system 220. In an embodiment, cloud system 210 may prompt user input device 240 to accept an end user license agreement (EULA) prior to installing the user application 218. Cloud system 210 may generate a graphical user interface to be utilized by user input device 240 to display the EULA for a user. The user may also provide an acknowledgement and/or agreement to abide by the terms of the EULA using the graphical user interface. Upon receiving the acknowledgment, cloud system 210 retrieves the application package, unpacks the package, and generates user application 218 based on the instructions included in the application package. While cloud system 210 performs the installation process, cloud system 210 may generate a graphical user interface indication indicating that the installation process is executing. The indication may be, for example, a spinning wheel illustration.

After installing user application 218, cloud system 210 performs a configuration process to allow user input device 240 to utilize user application 218 and/or third party application 228. Based on instructions included in the application package utilized during installation and/or instructions included in user application 218, cloud system 210 performs a configuration of user application 218. In an embodiment, cloud system 110 utilizes setup service interface 216 to perform the configuration process. Setup service interface 216 may communicate with third party setup service interface 226 to perform the configuration process. In an embodiment, setup service interface 216 and third party setup service interface 226 are APIs. In an embodiment, cloud system 210 utilizes commands and/or methods to facilitate the configuration of an installed user application 218. For example, cloud system 210 may transmit a command from setup service interface 216 to third party setup service interface 226 requesting an indication that the third party setup service interface 226 is ready to being a configuration process, a notification that the application package has been successfully installed as user application 218, a command to perform a synchronous setup task on third party cloud system 220, perform an asynchronous setup task on third party cloud system 220, provide information supplied by user input device 240, and/or other communications required to perform the configuration process.

In an embodiment third party configuration service 228 provides a configuration plan detailing the information required from cloud system 210 in order to enable access to the functionality provided by third party application 228. The configuration plan may differ based on the information required to operate and/or configure third party application 228. Third party configuration service 228 executes the configuration plan and utilizes third party setup service interface 226 to request configuration information cloud system 210. In an embodiment, the application package may also include portions of the configuration plan. In an embodiment, communications between cloud system 210 and third party cloud system 220 occur using an HTTP protocol and/or are secured using authentication/authorization mechanisms, such as, for example, OAuth.

Based on the configuration plan detailed by third party configuration service 228, cloud system 210 utilizes configuration interface 214 to supply the requested configuration information to third party cloud system 220. In an embodiment, configuration interface 214 utilizes setup service interface 216 to communicate with third party setup service interface 226. Configuration interface 214 also generates a graphical user interface that allows user input device 240 to supply the requested configuration data within the cloud-based computing platform provided by cloud system 210. Using this graphical user interface, user input device 240 will visualize a seamless installation and configuration process within the cloud-based computing platform. Because cloud system 210 communicates with third party cloud system 220 to execute the configuration plan, users need not separately contact and/or provide the configuration information to the administrators of third party cloud system 220 in order to utilize the functions of third party application 228.

In an embodiment, configuration interface 214 retrieves the configuration plan and packages the configuration plan to be displayed as a flow-based configuration process. In this manner, users may be able to intuitively provide requested configuration information from within the cloud-based computing platform. The flow-based configuration process may depend on the parameters requested in the configuration plan and/or may differ based on different third party applications 228. In an embodiment, cloud system 210 generates a graphical user interface having a common theme and/or layout independent from the information requested in the configuration plan. In this manner, users are able to become familiar with the configuration process as similar themes are utilized even if the user installs multiple user applications 218 and third party applications 228 from multiple third party cloud systems.

Using configuration interface 214, cloud system 210 is able to provide a uniform graphical user interface for executing configurations processes, allowing user input device 240 to supply the requested information to third party cloud system 220 based on the configuration plan associated with third party application 228.

After the successful completion of a configuration process, user input device 240 is able to utilize user application 218. Depending on the types of services and/or software functionalities enabled by third party application 228, user application 218 may or may not continue to communicate with third party cloud system 220 to perform operations requested by user input device 240. For example, if third party application 228 is a standalone application that may be installed as user application 218 and executed on the cloud-based computing platform, completion of the configuration process may allow for usage of user application 218 without further interactions from third party cloud system 220. If third party application 228 is a cloud-based service, however, utilizing user application 218 may cause cloud system 210 to continue to communicate with third party cloud system 220 in order to provide third party application 228 functionality to the cloud-based computing platform provided by cloud system 210.

To illustrate, third party application 228 may be a voice support application. When installed, configured, and enabled, the voice support application will allow user input device 240 to generate and/or receive phone calls within the cloud-based computing platform provided by cloud system 210. That is, rather than natively installing a voice support program on user input device 240, user input device 240 is able to access the cloud-based computing platform provided by cloud system 210 to perform remote computing as well as generate and receive phone calls.

When first deciding whether to enable this functionality, user input device 240 may browse application exchange 212 to locate third party application 228. User input device 240 may then submit a command to cloud system 210 to enable third party application 228 for use with the cloud-based computing platform. In an embodiment, this selection also causes cloud system 210 to generate an association between an account belonging to the user and the third party application 228.

In an embodiment, the voice support application may be functionality to be provided for multiple user input devices. For example, an administrator of cloud system 210 may utilize a first user input device 240 to select and/or add the voice support application. Based on the installation and configuration of the voice support application, the administrator may specify that user input devices 240 having access to cloud system 210 will be able to utilize the voice support functions of third party application 228. In this manner, user application 218 represents objects and/or programs utilized to communicate with third party cloud system 220 to enable the voice support functions. While some files and/or user settings or preferences may be stored locally at cloud system 210, third party cloud system 220 still retains the medium for allowing and generating phone calls on behalf of users utilizing the cloud-based computing platform of cloud system 210. In this manner, after installation and configuration of user application 218, cloud system 210 will continue to interact with third party cloud system 220 when user input devices 240 generate or receive phone calls from third party application 228.

To enable access to third party application 228, cloud system 210 determines whether the user application 218 is installed in cloud system 210. In an embodiment, cloud system 210 checks for the presence of user application 218 in a registry of installed programs. If user application 218 is found, then the voice support application has been installed. If the voice support application has been installed, cloud system 210 executes a configuration process to configure the voice support application. If the voice support application is not installed, cloud system 210 retrieves an application package from third party cloud system 220 for installation. Cloud system 210 may generate user application 218 and/or extract local files and/or executables to be maintained by cloud system 210 to enable the cloud-based voice support application. Cloud system 210 may also display the progress of the installation to user input device 240. After completing the installation process, cloud system 210 generates a configuration process to enable usage of the voice support application.

To perform the configuration process, setup service interface communicates 216 with third party setup service interface 226 to load the configuration plan detailed by third party configuration service 228. In an embodiment, to enable voice support, the configuration plan may request a URL directing a web browser to a web page or web server administrated by the same administrator as third party cloud system 220 and/or may request contact information, such as names, phone numbers, or email address, of user who will be granted access to the voice support application. Based on the information detailed by the configuration plan, cloud system 210 generates a graphical user interface using configuration interface 214 to be displayed on user input device 240. The graphical user interface may include several screens and/or slides to represent a flow of requested information.

For example, a first slide may request the URL to verify access to the web page and/or web server utilized by third party cloud system 220. User input device 240 may submit the URL to configuration interface 214, and configuration interface 214 may utilize setup service interface 216 to transmit the URL to third party setup service interface 226. Third party) configuration service 228 then verifies the provided URL to determine compliance with the configuration plan. Third party setup service interface 226 may then transmit a message to setup service interface 216 indicating that the provided URL has been verified.

After verifying the URL, configuration interface 214 may generate a second slide requesting contact information, such as names, phone numbers, or email address, of user who will be granted access to the voice support application. In an embodiment, user input device 240 may submit this information by individually submitting records to cloud system 210 using a graphical interface. In an embodiment, configuration interface 214 prepopulates a list of potential users using information stored in cloud system 210 related to users of the cloud-based computing platform provided by cloud system 210. In this manner, because cloud system 210 manages cloud computing usages by various users, cloud system 210 is able to utilize that information to generate the list of potential users. Viewing the list of users on user input device 240, an administrator may select the users allowed to utilize the voice support application. In an embodiment, cloud system 210 also associates the user accounts allowed to utilized the voice support application with user application 218.

Based on the selection of users, setup service interface 216 transmits the information related to the allowed users to third party cloud system 220. Third party) configuration service 228 then stores this information to utilize when authenticating users attempting to utilize the voice support application functionalities of third party application 228.

In an embodiment, when third party configuration service 228 receives the user identification, the configuration plan indicates that the configuration process has completed. In an embodiment, third party setup service interface 226 transmit to cloud system 210 an indication that the configuration process has successfully completed. Cloud system 210 may then indicate that the configuration has completed using configuration interface 214. Upon completion of the configuration process, user input device 240 as well as other user designated as allowed to utilized the voice support application may access the cloud-based computing platform hosted by cloud system 210.

When generating a call and/or receiving a call, user input device 240 accesses user application 218, which provides an interface using configuration interface 214 for participating in the call. Third party) cloud system 220 facilitates the communication aspects of the phone call and connects the user input device 240 to the other call participants.

FIG. 3 illustrates a flowchart illustrating a method 300 for enabling a configuration process, according to exemplary embodiments. Method 300 shall be described with reference to FIG. 2; however, method 300 is not limited to that example embodiment.

In an embodiment, cloud system 210 utilizes method 300 to generate a configuration process that allows a second cloud-based application to become usable with a first cloud-based application. The foregoing description will describe an embodiment of the execution of method 300 with respect to cloud system 210. While method 300 is described with reference to cloud system 210, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 310, cloud system 210 receives from a first cloud-based application executing on a device, a request to enable a second cloud-based application for use with the first cloud-based application, wherein the second cloud-based application requires completion of a configuration process. The device may be user input device 240 or may be a computing device utilizing a hardwire connection to cloud system 210. The first cloud-based application executing on the device may be a program or application natively installed on the device and/or a web page accessed by the device. The first cloud-based application executes on the device by allowing a user of the device to interact with the first cloud-based application and perform cloud-based computing. In an embodiment, cloud system 210 generates a graphical user interface to be display on user input device 240.

In an embodiment, the second cloud-based application includes a selection of an application from application exchange 212. In an embodiment, the second cloud-based application may be provided by cloud system 210 or may be an application provided by third party cloud system 220, such as third party application 228. The second cloud-based application is an application that works in conjunction with the cloud-based computing functionality of the first cloud-based application. For example, the second cloud-based application may allow the first cloud-based application to perform software functions associated with third party application 228.

In an embodiment, the second cloud-based application requires the completion of a configuration process. This configuration process may include retrieving configuration parameters, such as, for example, identification information, settings, and/or preferences from user input device 240. Cloud system 210 may store the configuration parameters to complete the configuration process and/or transmit the configuration parameters to third party cloud system 220 to complete the configuration process. At 310, receipt of the request to enable the second cloud-based application begins the configuration process.

At 320, cloud system 210 retrieves a package including instructions for executing the configuration process. In an embodiment, the package is stored internally on cloud system 210 in memory, such as, for example, a database. Cloud system 210 then retrieves the instructions from memory to execute the configuration process. In an embodiment, cloud system 210 retrieves the package from third party cloud system 220. In an embodiment, cloud system 210 retrieves the package via an exposed API. The package may include instructions related to a configuration plan indicating the information requested by third party cloud system 220 in order to facilitate access to the functionality of the second cloud-based application.

At 330, cloud system 210 repackages the configuration process such that the configuration process is accessible via the first cloud-based application. In an embodiment, cloud system 210 organizes the instructions in a flow and/or generates a graphical user interface to be displayed on user input device 240 to guide the user in providing configuration parameters. In an embodiment, cloud system 210 retrieves the package from third party cloud system 220 and generates a graphical user interface based on the information requested by third party cloud system 220. In an embodiment, user input device 240 may select multiple cloud-based applications to use with the first cloud-based application, and cloud system 210 may utilize a common theme and/or layout when repackaging the configuration process associated with each of the multiple cloud-based applications.

At 340, based on the repackaging, cloud system 210 then transmits the configuration process to the device via the first cloud-based application. In an embodiment, cloud system 210 transmits the graphical user interface to user input device 240 so that user input device 240 may display the graphical user interface. By interacting with the graphical user interface, users are able to provide requested configuration parameters to cloud system 210 and/or third party cloud system 220. In an embodiment, the configuration process is accessible and/or displayed from within the first cloud-based application. For example, if the first cloud-based application is a remote desktop or an Internet browser-based application, cloud system 210 generates a graphical user interface within the viewing screen of the remote desktop and/or Internet browser and transmits the graphical user interface to user input device 240 to be displayed within the viewing screen. By interacting with the configuration process, user input device 240 is able to supply the requested information to obtain access to the second cloud-based application.

FIG. 4 illustrates a flowchart illustrating a method 400 for executing an installation and configuration process, according to exemplary embodiments. Method 400 shall be described with reference to FIG. 2; however, method 400 is not limited to that example embodiment.

In an embodiment, cloud system 210 utilizes method 400 to execute an installation process and generate a configuration process that allows for the delivery of configuration information from a graphical user interface to third party cloud system 220. The foregoing description will describe an embodiment of the execution of method 400 with respect to cloud system 210. While method 400 is described with reference to cloud system 210, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 410, cloud system 210 receives an application request from a device, wherein the application request includes instructions to install a cloud-based application. The device may be user input device 240 or may be a computing device utilizing a hardwire connection to cloud system 210. User input device 240 may request an installation of the cloud-based application into a cloud-based computing platform so that the cloud-based application can be used in conjunction with the cloud-based computing platform. In an embodiment, cloud system 210 receives the application request based on a selection of third party application 228 from application exchange 212.

At 420, cloud system 210 analyzes the instructions to determine if the cloud-based application is already installed. In an embodiment, the cloud-based application may be third party application 228. In an embodiment, cloud system 210 searches an internal registry to determine if user application 218 is stored in cloud system 210 memory. In an embodiment, user application 218 may be a mirror of third party) application 228 and may represent an installed version of third party application 228. In an embodiment, user application 218 also retains user parameters, configurations, and/or settings that customize third party application 228 for individual user profiles and/or user input devices 240. User application 218 stores an instance of third party application 228 and/or acts as a medium for communication with third party application 228. In an embodiment, user application 218 stores certain files and/or programs for execution and use in conjunction with third party cloud system 220 to allow user input device 240 to utilize the functions of third party application 228.

At 430, cloud system 210 determines if the cloud-based application is already installed. This determination is based on the presence of user application 218. If the cloud-based application is not installed, cloud system 210 proceeds to 440 to perform the installation process. If the cloud-based application is installed, cloud system 210 proceeds to 460 to perform the configuration process.

At 440, cloud system 210 retrieves an installation package from third party) cloud system 220. In an embodiment, cloud system 210 retrieves and/or downloads the installation package via an API provided by third party cloud system 220. At 450, cloud system 210 installs the cloud-based application using the installation package. Cloud system 210 installs files contained in the installation package locally, including, for example, graphical user interface generation objects and/or software code to be executed by cloud system 210 based on commands received from user input device 240. Via the installation of user application 218, cloud system 210 is able to execute the functions of third party application 228 locally on cloud system 210 and/or establish communications with third party cloud system 220 to perform the functions of third party application 228 together.

At 460, cloud system 210 renders a graphical user interface to display a configuration process associated with the cloud-based application. In an embodiment, the creation of the graphical user interface occurs after installation of the cloud-based application. The graphical user interface organizes the configuration process so that the device requesting usage of the application is able to configure the application. In an embodiment, the graphical user interface displaying the configuration process is generated within a cloud-based computing platform utilized by user input device 240. The graphical user interface prompts the user input device 240 to supply configuration information requested by the third party cloud system 220.

At 470, after rendering the graphical user interface and receiving configuration information from user input device 240, cloud system 210 delivers the configuration information gathered from the graphical user interface to third party cloud system 220. In an embodiment, cloud system 210 delivers the configuration information using an API. In an embodiment, cloud system 210 may execute 460 and 470 in conjunction, requesting and/or prompting user input device 240 to provide requested configuration information and delivering the gathered configuration as user input device 240 provides the configuration information. In an embodiment, the configuration process includes requesting, receiving, and delivering configuration information until completing a configuration plan detailed by third party cloud system 220. In an embodiment, configuration plans may be associated with third party applications 228 and may differ based on a particular third party application 228 that is requested. In an embodiment, the configuration plan is completed when third party cloud system 220 receives sufficient information to enable the usage of third party application 228 functionality for user input device 240. In an embodiment, the configuration information may include information related to different users of cloud system 210 given permission to utilize the third party application 228 functionality. After completing the configuration plan, third party cloud system 220 grants access to the users to utilize the third party application 228 functionality. In an embodiment, cloud system 210 and/or third party cloud system 220 tracks the number of iterations of completion of the configuration plan. In an embodiment, cloud system 210 may generate a record of the number of completions and/or utilize this number to generate an invoice to third party cloud system 220 for the configuration integration services provided by cloud system 210.

Figure 5:
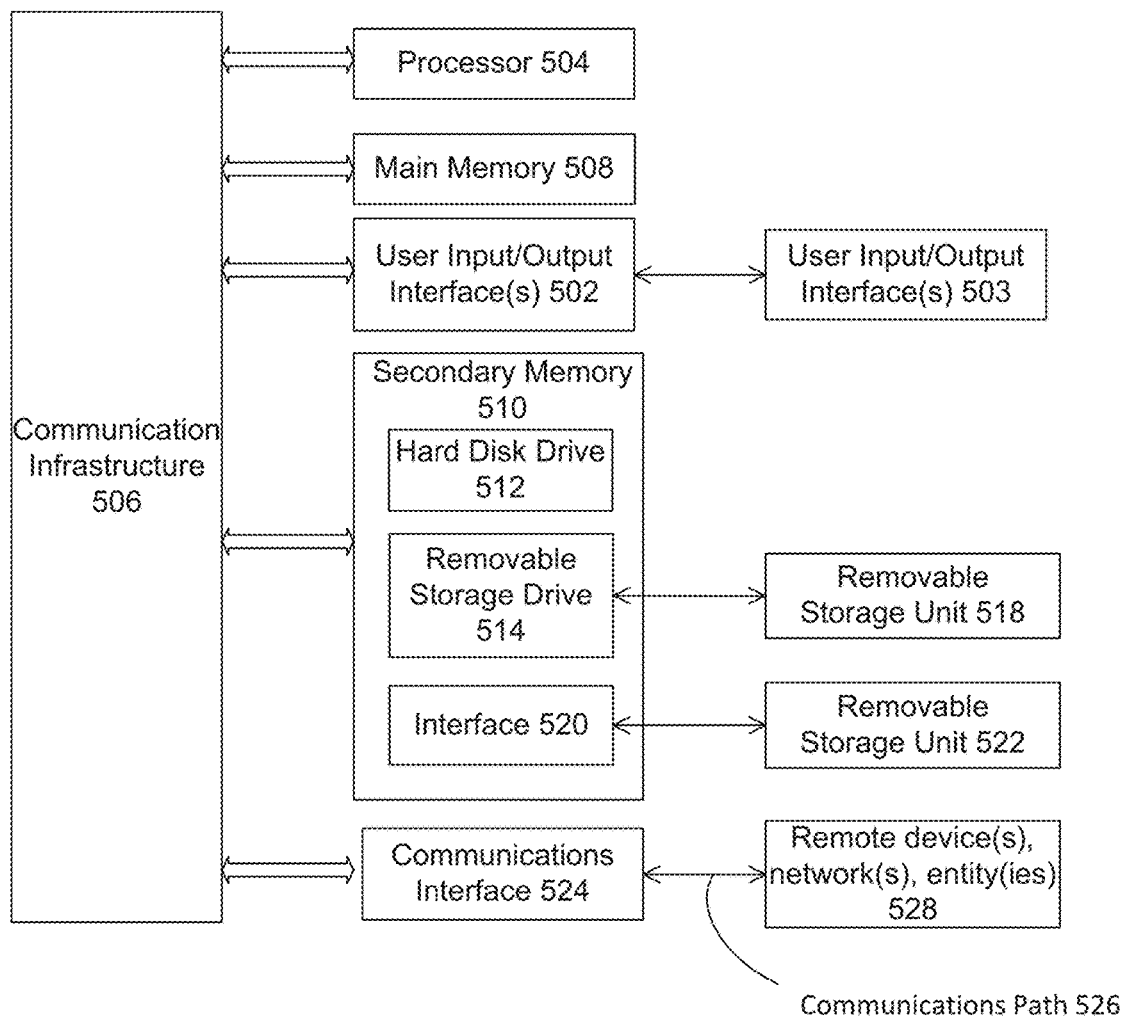
FIG. 5 is an example computer system useful for implementing various embodiments.

FIG. 5 is an example computer system 500 useful for implementing various embodiments. Various embodiments of the disclosure may be implemented, for example, using one or more computer systems, such as computer system 500 shown in FIG. 5. One or more computer systems 500 (or portions thereof) can be used, for example, to implement cloud system 110 and/or 210 of FIGS. 1 and 2.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary, embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communication path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method within a cloud system for enabling and configuring a cloud-based application hosted by a third party system, comprising:
    receiving, at the cloud system and from a first cloud-based application executing on a device, a request to enable configuration and installation of a second cloud-based application from a third party system external to the cloud system for use with the first cloud-based application, wherein the second cloud-based application requires completion of a configuration process corresponding to the third party system and wherein the third party system hosts the second cloud-based application,
    wherein the third party system has at least one of the following properties: an administrator of the cloud system does not have permission to configure the second cloud-based application from the third party system, the third party system utilizes different security protocols from the cloud system, the third party system is different from an organization administrating the cloud system;
    transmitting, by the cloud system, configuration parameters to the third party system for completing the configuration process;
    in response to transmitting the configuration parameters, retrieving, at the cloud system, a package from the third party system, the package including instructions for executing the configuration process of the second cloud-based application;
    repackaging, by the cloud system, the configuration process such that the configuration process is accessible via the first cloud-based application; and
    transmitting, by the cloud system, the configuration process to the device via the first cloud-based application such that the configuration process is visualized within the first cloud-based application.

2. The computer-implemented method of claim 1, wherein the repackaging includes:
    generating a graphical user interface integrating the configuration process with the first cloud-based application.

3. The computer-implemented method of claim 1, wherein the repackaging includes:
   retrieving user identification data stored by the first cloud-based application; and
   populating the configuration process with the user identification data such that a subset of the user identification data is selectable.

4. The computer-implemented method of claim 1, further comprising:
   receiving, from the device second cloud-based application, configuration information via the first cloud-based application; and
   transmitting the configuration information to the third party system hosting the second cloud-based application.

5. The computer-implemented method of claim 1, further comprising:
   installing one or more program objects from the package in response to retrieving the package.

6. The computer-implemented method of claim 1, further comprising:
   searching a registry to determine whether the second cloud-based application has been installed; and
   installing one or more program objects from the package in response to determining that the second cloud-based application has not been installed.

7. The computer-implemented method of claim 1, wherein the second cloud-based application enables the first cloud-based application to generate telephone calls.

8. A cloud system configured to enable and configure a cloud-based application hosted by a third party system, comprising:
   a memory; and
   one or more processors, coupled to the memory, configured to:
      receive, at the cloud system and from a first cloud-based application executing on a device, a request to enable configuration and installation of a second cloud-based application from a third party system external to the cloud system for use with the first cloud-based application, wherein the second cloud-based application requires completion of a configuration process of the second cloud-based application corresponding to the third party system and wherein the third party system hosts the second cloud-based application,
      wherein the third party system has at least one of the following properties: an administrator of the cloud system does not have permission to configure the second cloud-based application from the third party system, the third party system utilizes different security protocols from the cloud system, the third party system is different from an organization administrating the cloud system;
      transmit, by the cloud system, configuration parameters to the third party system for completing the configuration process;
      in response to transmitting the configuration parameters, retrieve, at the cloud system, a package from the third party system, the package including instructions for executing the configuration process;
      repackage, by the cloud system, the configuration process such that the configuration process is accessible via the first cloud-based application; and
      transmit, by the cloud system, the configuration process to the device via the first cloud-based application such that the configuration process is visualized within the first cloud-based application.

9. The system of claim 8, wherein to repackage the configuration process, the one or more processors are further configured to:
   generate a graphical user interface integrating the configuration process with the first cloud-based application.

10. The system of claim 8, wherein to repackage the configuration process, the one or more processors are further configured to:
    retrieve user identification data stored by the first cloud-based application in the memory; and
    populate the configuration process with the user identification data such that a subset of the user identification data is selectable.

11. The system of claim 8, wherein the one or more processors are further configured to:
    receive, from the device second cloud-based application, configuration information via the first cloud-based application; and
    transmit the configuration information to the third party system hosting the second cloud-based application.

12. The system of claim 8, wherein the one or more processors are further configured to:
    install one or more program objects from the package in response to retrieving the package.

13. The system of claim 8, wherein the one or more processors are further configured to:
    search a registry to determine whether the second cloud-based application has been installed; and
    install one or more program objects from the package in response to determining that the second cloud-based application has not been installed.

14. The system of claim 8, wherein the second cloud-based application enables the first cloud-based application to generate telephone calls.

15. A tangible, non-transitory computer-readable device having instructions stored thereon that, when executed by at least one computing device, causes the at least one computing device to perform operations comprising:
    receiving, at a cloud system and from a first cloud-based application executing on a device, a request to enable configuration and installation of a second cloud-based application from a third party system external to the cloud system for use with the first cloud-based application, wherein the second cloud-based application requires completion of a configuration process corresponding to the third party system and wherein the third party system hosts the second cloud-based application,
    wherein the third party system has at least one of the following properties: an administrator of the cloud system does not have permission to configure the second cloud-based application from the third party system, the third party system utilizes different security protocols from the cloud system, the third party system is different from an organization administrating the cloud system;
    transmitting, by the cloud system, configuration parameters to the third party system for completing the configuration process;
    in response to transmitting the configuration parameters, retrieving, at the cloud system, a package from the third party system, the package including instructions for executing the configuration process of the second cloud-based application;

repackaging, by the cloud system, the configuration process such that the configuration process is accessible via the first cloud-based application; and transmitting, by the cloud system, the configuration process to the device via the first cloud-based application such that the configuration process is visualized within the first cloud-based application.

16. The tangible, non-transitory computer-readable device of claim 15, wherein to repackage the configuration process, the operations further comprise:

generating a graphical user interface integrating the configuration process with the first cloud-based application.

17. The tangible, non-transitory computer-readable device of claim 15, wherein to repackage the configuration process, the operations further comprise:

retrieving user identification data stored by the first cloud-based application; and populating the configuration process with the user identification data such that a subset of the user identification data is selectable.

18. The tangible, non-transitory computer-readable device of claim 15, the operations further comprising:

receiving, from the device second cloud-based application, configuration information via the first cloud-based application; and transmitting the configuration information to the third party system hosting the second cloud-based application.

19. The tangible, non-transitory computer-readable device of claim 15, the operations further comprising:

searching a registry to determine whether the second cloud-based application has been installed; and installing one or more program objects from the package in response to determining that the second cloud-based application has not been installed.

20. The tangible, non-transitory computer-readable device of claim 15, wherein the second cloud-based application enables the first cloud-based application to generate telephone calls.

* * * * *